(12) United States Patent  
Saito

(10) Patent No.: US 7,965,402 B2
(45) Date of Patent: Jun. 21, 2011

(54) PRINTING SYSTEM AND PRINTING PROCESSING METHOD

(75) Inventor: Kazuyuki Saito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1107 days.

(21) Appl. No.: 11/186,987

(22) Filed: Jul. 22, 2005

(65) Prior Publication Data

US 2006/0028667 A1    Feb. 9, 2006

(30) Foreign Application Priority Data

Aug. 6, 2004 (JP) ................................. 2004-231436

(51) Int. Cl.
*G06K 15/00* (2006.01)
*G06K 3/12* (2006.01)
*G06F 3/00* (2006.01)
*G06F 3/048* (2006.01)

(52) U.S. Cl. ....... 358/1.15; 358/1.14; 715/744; 715/763
(58) Field of Classification Search ......... 358/1.11–1.18
See application file for complete search history.

(56) References Cited

U.S. PATENT DOCUMENTS

| | | | |
|---|---|---|---|
| 6,173,295 B1 | 1/2001 | Goertz et al. | 707/505 |
| 6,380,951 B1* | 4/2002 | Petchenkine et al. | 715/736 |
| 6,642,943 B1* | 11/2003 | Machida | 715/763 |
| 6,825,941 B1* | 11/2004 | Nguyen et al. | 358/1.15 |
| 7,085,006 B2* | 8/2006 | Yokoyama et al. | 358/1.9 |
| 7,271,924 B1* | 9/2007 | Takamizawa et al. | 358/1.14 |
| 2002/0171681 A1* | 11/2002 | Nomura et al. | 345/772 |
| 2003/0002065 A1* | 1/2003 | Tanaka | 358/1.14 |
| 2003/0058284 A1* | 3/2003 | Toh et al. | 345/810 |
| 2003/0090713 A1 | 5/2003 | Saito | 358/1.15 |
| 2003/0103232 A1* | 6/2003 | Twede | 358/1.15 |
| 2003/0202213 A1 | 10/2003 | Saito | 358/1.18 |
| 2004/0027603 A1* | 2/2004 | Ueda et al. | 358/1.14 |
| 2004/0057073 A1* | 3/2004 | Egawa et al. | 358/1.15 |
| 2004/0085583 A1* | 5/2004 | Yamamura | 358/1.18 |
| 2004/0125402 A1* | 7/2004 | Kanai et al. | 358/1.15 |
| 2004/0190057 A1* | 9/2004 | Takahashi et al. | 358/1.15 |
| 2005/0262274 A1 | 11/2005 | Aoki et al. | 710/15 |

FOREIGN PATENT DOCUMENTS

| | | |
|---|---|---|
| CN | 1497425 | 5/2004 |
| JP | 11-85422 | 3/1999 |
| JP | 2002-215353 | 8/2002 |

\* cited by examiner

*Primary Examiner* — King Y Poon
*Assistant Examiner* — Ming Hon
(74) *Attorney, Agent, or Firm* — Fitzpatrick, Cella, Harper & Scinto

(57) ABSTRACT

A printing system capable of processing target print data by a selected processing method, comprises specifying means that enables a user to specify print data processing units and their order of execution from a function library; printing processing means that causes the specified print data processing units to process the print data in the order specified using the specifying means; and output means that outputs an image based on the print data processed by the printing processing means.

12 Claims, 18 Drawing Sheets

```
<PRINTING_CAPABILITY>
    <BASIC_SETTINGS   PAPER_SIZE="A4, A3, B4, B3"
                     NUMBER_OF_COPIES="1000"
                     PAPER_ORIENTATION="VERTICAL, HORIZONTAL"
                     ... />
    <FUNCTIONAL_FILTER_CONFIGURATION>
        <FilterInfoName="4up"_Order="0"_EDGE_FLAG="0" />
        <FilterInfoName="PAGE NUMBER ADDITION" Order="0" EDGE FLAG="0" />
        <FilterInfoName="COPY-FORGERY-INHIBITED PATTERN"_Order="0"_EDGE_FLAG="1" />
        <FilterInfoName="MASK"_Order="0"_EDGE_FLAG="-1" />
        <FilterInfoName="STAMP (SECRET)"_Order="0"_EDGE_FLAG="0" />
        <FilterInfoName="ARCHIVE"_Order="0"_EDGE_FLAG="-2" />
        ...
    </FUNCTIONAL_FILTER_CONFIGURATION>
</PRINTING_CAPABILITY>
```

402

```
<JOB_TICKET>
    <BASIC_SETTINGS   PAPER_SIZE="DEFAULT"
                     NUMBER_OF_COPIES="DEFAULT"
                     PAPER_ORIENTATION="DEFAULT" ... />
    <FUNCTIONAL_FILTER_CONFIGURATION>
        <FilterInfoName="4up" Order="0"_EDGE_FLAG="0" />
        <FilterInfoName="PAGE NUMBER ADDITION"_Order="0"_EDGE_FLAG="0" />
        <FilterInfoName="COPY-FORGERY-INHIBITED PATTERN"_Order="0"_EDGE_FLAG="1" />
        <FilterInfoName="MASK"_Order="0"_EDGE FLAG="-1" />
        <FilterInfoName="STAMP (SECRET)"_Order="0" EDGE_FLAG="0" />
        <FilterInfoName="ARCHIVE" Order="0" EDGE_FLAG="-2" />
        ...
    </FUNCTIONAL_FILTER_CONFIGURATION>
</JOB_TICKET>
```

```
<JOB_TICKET>
    <BASIC_SETTINGS    PAPER_SIZE="A4"
                       NUMBER_OF_COPIES="1"
                       PAPER_ORIENTATION="VERTICAL" ···  />
    <FUNCTIONAL FILTER CONFIGURATION>
        <FilterInfoName="4up"_Order="0"_EDGE_FLAG="0" />
        <FilterInfoName="PAGE NUMBER ADDITION" Order="0" EDGE_FLAG="0" />
        <FilterInfoName="COPY-FORGERY-INHIBITED PATTERN"_Order="0"_EDGE_FLAG="1" />
        <FilterInfoName="MASK"_Order="0"_EDGE_FLAG="-1" />
        <FilterInfoName="STAMP(SECRET)"_Order="0"_EDGE_FLAG="0" />
        <FilterInfoName="ARCHIVE"_Order="0"_EDGE_FLAG="-2" />
            ...
    </FUNCTIONAL_FILTER_CONFIGURATION>
</JOB_TICKET>
```

```
<JOB_TICKET>
   <BASIC_SETTINGS    PAPER_SIZE="A4"
                     NUMBER_OF_COPIES="1"
                     PAPER_ORIENTATION="VERTICAL" … />
   <FUNCTIONAL_FILTER_CONFIGURATION>
      <FilterInfoName="4up"_Order="2"_EDGE_FLAG="0" />
      <FilterInfoName="PAGE NUMBER ADDITION" Order="3" EDGE_FLAG="0" />
      <FilterInfoName="COPY-FORGERY-INHIBITED PATTERN"_Order="0"_EDGE_FLAG="1" />
      <FilterInfoName="MASK"_Order="0"_EDGE_FLAG="-1" />
      <FilterInfoName="STAMP (SECRET)"_Order="1"_EDGE_FLAG="0" />
      <FilterInfoName="ARCHIVE"_Order="0"_EDGE_FLAG="-2" />
         …
   </FUNCTIONAL_FILTER_CONFIGURATION>
</JOB_TICKET>
```

902

```
<JOB_TICKET>
   <BASIC_SETTINGS    PAPER_SIZE="A4"
                     NUMBER_OF_COPIES="1"
                     PAPER_ORIENTATION="VERTICAL" … />
   <FUNCTIONAL_FILTER_CONFIGURATION>
      <FilterInfoName="4up"_Order="2"_EDGE_FLAG="0" />
      <FilterInfoName="PAGE NUMBER ADDITION"_Order="1"_EDGE_FLAG="0" />
      <FilterInfoName="COPY-FORGERY-INHIBITED PATTERN"_Order="0"_EDGE_FLAG="1" />
      <FilterInfoName="MASK"_Order="0"_EDGE_FLAG="-1" />
      <FilterInfoName="STAMP (SECRET)"_Order="3" EDGE FLAG="0" />
      <FilterInfoName="ARCHIVE" Order="0" EDGE_FLAG="-2" />
         …
   </FUNCTIONAL_FILTER_CONFIGURATION>
</JOB_TICKET>
```

```
<JOB_TICKET>
   <BASIC_SETTINGS    PAPER_SIZE="A4"
                      NUMBER_OF_COPIES="1"
                      PAPER_ORIENTATION="VERTICAL" ··· />
   <FUNCTIONAL_FILTER_CONFIGURATION>
      <FilterInfoName="4up"_Order="2"_EDGE_FLAG="0" />
      <FilterInfoName="PAGE NUMBER ADDITION" Order="1" EDGE_FLAG="0" />
      <FilterInfoName="COPY-FORGERY-INHIBITED PATTERN"_Order="4"_EDGE_FLAG="1"/>
      <FilterInfoName="MASK"_Order="0"_EDGE_FLAG="-1" />
      <FilterInfoName="STAMP (SECRET)"_Order="3"_EDGE_FLAG="0" />
      <FilterInfoName="ARCHIVE"_Order="0"_EDGE_FLAG="-2" />
         ...
   </FUNCTIONAL_FILTER_CONFIGURATION>
</JOB_TICKET>
```

1202

```
<JOB_TICKET>
   <BASIC_SETTINGS    PAPER_SIZE="A4"
                      NUMBER_OF_COPIES="1"
                      PAPER_ORIENTATION="VERTICAL" ··· />
   <FUNCTIONAL_FILTER_CONFIGURATION>
      <FilterInfoName="4up"_Order="3"_EDGE_FLAG="0" />
      <FilterInfoName="PAGE NUMBER ADDITION"_Order="1"_EDGE_FLAG="0" />
      <FilterInfoName="COPY-FORGERY-INHIBITED PATTERN"_Order="2"_EDGE_FLAG="1"/>
      <FilterInfoName="MASK"_Order="0"_EDGE_FLAG="-1" />
      <FilterInfoName="STAMP (SECRET)"_Order="0" EDGE_FLAG="0" />
      <FilterInfoName="ARCHIVE" Order="0" EDGE_FLAG="-2" />
         ...
   </FUNCTIONAL_FILTER_CONFIGURATION>
</JOB_TICKET>
```

F I G. 17

121

```
<ORDER_RESTRICTION_TABLE>
  <FUNCTIONAL_FILTER_CONFIGURATION>
    <FilterInfoName="4up" EDGE_FLAG="0" />
    <FilterInfoName="PAGE NUMBER ADDITION" EDGE_FLAG="0" />
    <FilterInfoName="COPY-FORGERY-INHIBITED PATTERN" EDGE_FLAG="1" />
    <FilterInfoName="MASK" EDGE_FLAG="-1" />
    <FilterInfoName="STAMP(SECRET)"_EDGE_FLAG="0" />
    <FilterInfoName="ARCHIVE" EDGE_FLAG="2" />
       ...
  </FUNCTIONAL_FILTER_CONFIGURATION>
</ORDER_RESTRICTION_TABLE>
```

PRINTING SYSTEM AND PRINTING PROCESSING METHOD

FIELD OF THE INVENTION

This invention relates to a printing system that prints and outputs print data having a job ticket, for example, and more particularly, to a printing system and printing processing method capable of causing a printer driver to execute a process on the print data.

BACKGROUND OF THE INVENTION

Conventionally, when printing, a user sets printing process parameters (called print settings) using a user interface (UI) of a printer driver. In a printer driver of this type, a process to be performed on the print data can be set using the print settings. At the time of this setting, the printer driver displays a menu on the user interface that is limited to a combination of settable setting values (for example, Japanese Patent Application Laid-Open No. 11-85422). In addition, there is also that which performs such processing as checking the combination of setting values and if there is a contradiction revising the setting values so that the contradiction is eliminated (for example, Japanese Patent Application Laid-Open No. 2002-215353).

The processing of image data sometimes produces different results depending on the order of processing with other processes. Nevertheless, the order of processing of the print data in the conventional printer driver is fixed, and an operator cannot specify the order of processing. Consequently, depending on the order and combination of processes, it sometimes happens that the output results intended by the user cannot be obtained.

SUMMARY OF THE INVENTION

The present invention is conceived in light of the foregoing conventional art, and has as its object to provide a printing system and a printing processing method that allows the processes to be performed on the print data, including their order, to be specified.

In addition, the present invention has as its object to provide a printing system and a printing processing method that allow the printing process parameters to be set while an operator visually checks the output results of the specified processes.

In addition, the present invention has as its object to provide a printing system and a printing processing method that determine whether or not the settings set by the operator comply with restrictions on order for any process with an order restriction, and notifies the operator if a non-compliant setting has been carried out.

In addition, the present invention has as its object to provide a printing system and a printing processing method that determine whether or not the settings set by the operator comply with restrictions on order for any process with an order restriction, and restricts operation so that the non-compliant setting is not carried out.

In addition, the present invention has as its object to provide a printing system and a printing processing method that, when an additional process module (add-in function filter) is added to the printer driver, allows the process to be performed on the print data by that add-in function filter, including its order, to be specified just like any functional filter that is provided as standard equipment, the processing results checked visually, and any non-compliant setting identified.

The present invention, conceived in light of the foregoing conventional art, provides a printing system capable of processing target print data by a selected processing method, comprising:

specifying means that enables a user to specify print data processing units and their order of execution from a function library;

printing processing means that causes the specified print data processing units to process the print data in the order specified using the specifying means; and output means that outputs an image based on the print data processed by the printing processing means.

The present invention according to the above-described configuration allows the processes to be performed on the print data, including their order, to be specified. In addition, the invention allows the print process parameters to be set while an operator visually checks the output results of the specified processes. In addition, the invention determines whether or not the settings set by the operator comply with restrictions on order for any process with an order restriction, and notifies the operator if a non-compliant setting has been carried out. In addition, the invention determines whether or not the settings set by the operator comply with restrictions on order for any process with an order restriction, and restricts operation so that the non-compliant setting is not carried out. In addition, when an additional process module (add-in function filter) is added to the printer driver, the present invention allows a process to be performed on the print data by the add-in function filter, including its order, to be specified just like functional filters provided as standard equipment, the processing results checked visually, and any non-compliant setting identified.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a schematic diagram of a printing capability XML and a template job ticket according to the first embodiment;

FIG. 5 is a schematic diagram of a sample job ticket according to the first embodiment;

FIG. 9 is a schematic diagram of sample job tickets according to the first embodiment;

FIG. 12 is a schematic diagram of sample job tickets according to the first embodiment;

FIG. 17 is a schematic diagram of a sample order restriction table according to a third embodiment.

DETAILED DESCRIPTION OF THE PREFERRED EMBODIMENTS

Preferred embodiments of the present invention will now be described in detail in accordance with the accompanying drawings.

First Embodiment

Figure 1:
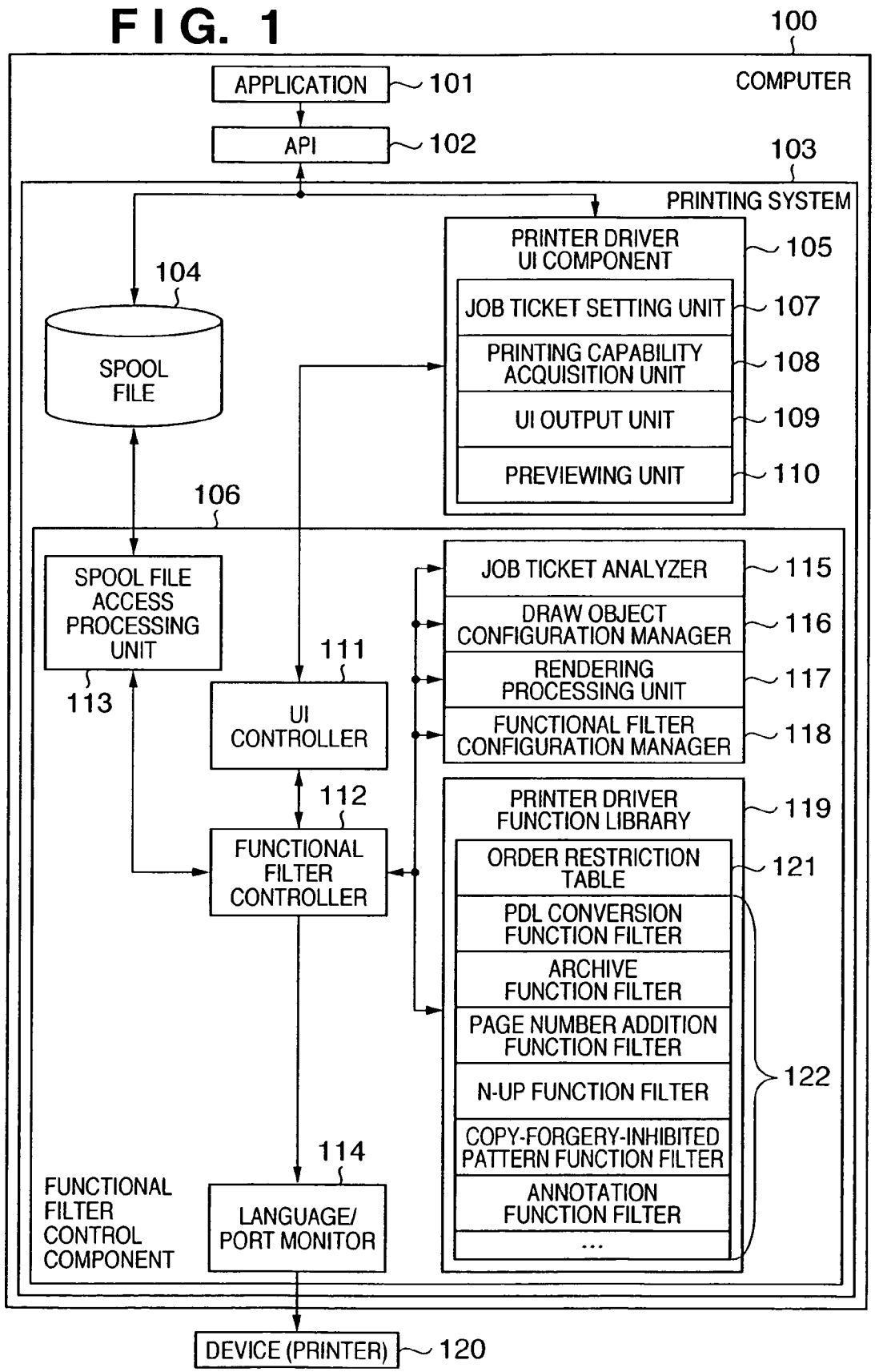
FIG. 1 is a system configuration block diagram according to a first embodiment of the present invention.
Figure 18:
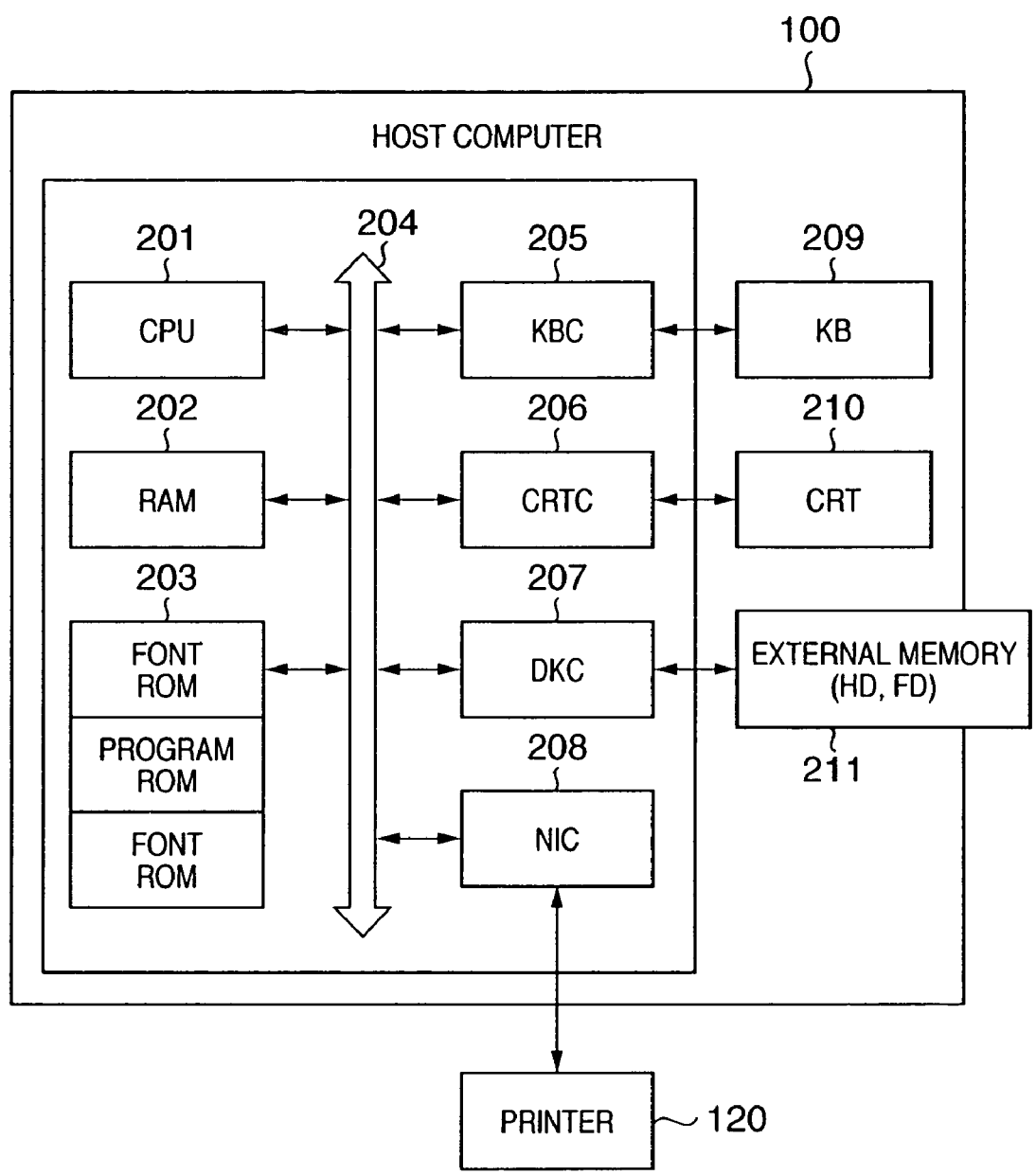
FIG. 18 is a system hardware block diagram of an embodiment.

FIG. 1 is a system block diagram showing a printing system according to a first embodiment. In FIG. 1, a device 120 is an independent apparatus such as a printer. The blocks of application 101, printer driver function library 119 as well as order restriction table 121 and the various functional filters of the functional filter group 122 are software resources of a computer 100. The computer 100 has the usual configuration of an ordinary computer as shown in FIG. 18. For example, the computer 100 has as hardware resources a processor 201, memories 202, 203, and a storage device 211 such as a hard disk, as well as a display 210, a keyboard 209, and input/output devices such as a pointing device, a network interface 208 and the like. As software resources, the computer 100 has an operating system as well as font and various application programs, as well as various device drivers including, first, a printer driver. FIG. 1 is a software block diagram, showing in particular the part relating to the printer driver. Each block is a program executed by the processor or an executed task, and FIG. 1 shows the interrelation between them. The configuration shown in FIG. 1 is described below.

The application 101 is an application program such as a document processing program, an image processing program or the like. The API 102 is an application programming interface (API) that is an interface between the application and the printing system. A printing system 103 is a printing system for implementing a print function by an application or the like. A spool file 104 is a spool file that retains printing capability information and job tickets.

A printer driver user interface 105 is a user interface (UI) that provides a user with various setting screens for the printer driver. A functional filter control component 106 controls a process by a functional filter in the printer driver. A functional filter is a software module for implementing a function such as various processes performed on print data by, for example, the printer driver. As an example of a functional filter, there is the insertion of page number and number of pages, the addition of a header or a footer, the addition of a copy-forgery-inhibited pattern, the insertion of a watermark and the like.

A job ticket setting unit 107 reflects print settings set using the printer driver UI in a job ticket. A job ticket is data comprising the actual contents of a print job generated in response to an instruction to print from an application or the like, and contains target print data as well as print settings that specify the print format and the like.

A printing capability acquisition unit 108 acquires the printing capability of the printer in order to set the print settings.

A UI output unit 109 outputs the printer driver UI to a display or the like.

A previewing unit 110 displays processes (functional filters) to be performed on target print data as set by the print settings as previews in the order selected by the operator.

A UI controller 111 controls the printer driver UI.

A functional filter controller 112 controls the execution and the like of the functional filters.

A spool file access processing unit 113 processes access to a spool file.

A language/port monitor 114 is an interface to a device (a printer or the like).

A job ticket analyzer 115 analyzes job ticket print instruction information.

A draw object configuration manager 116 manages the configuration of the draw objects included in the print data for output during printing.

A rendering processing unit 117 carries out drawing (rendering) of a draw object and the like.

A functional filter configuration manager 118 manages the configuration of the functional filter.

The printer driver function library 119 is a library of printer driver functional filters.

The device 120 is a printer or the like that outputs printed matter.

The order restriction table 121 retains restriction information on the order of the processes of the functional filters.

The various functional filters (print data processing units) 122 implement the functions of various processes and the like.

The printer driver of the configuration shown in FIG. 1, in this embodiment, indicates the printing system 103. However, in the case of ordinary programs provided by the operating system, the spool file 104 and the language/port monitor 114 are omitted from the configuration shown. In addition, in some cases the printer driver UI component 105 is also omitted.

(Print Setting and Print Preview)

Next, a description will be given of the flow of the printing process of the system shown in FIG. 1, with reference to FIGS. 2 through 12.

Figure 2:
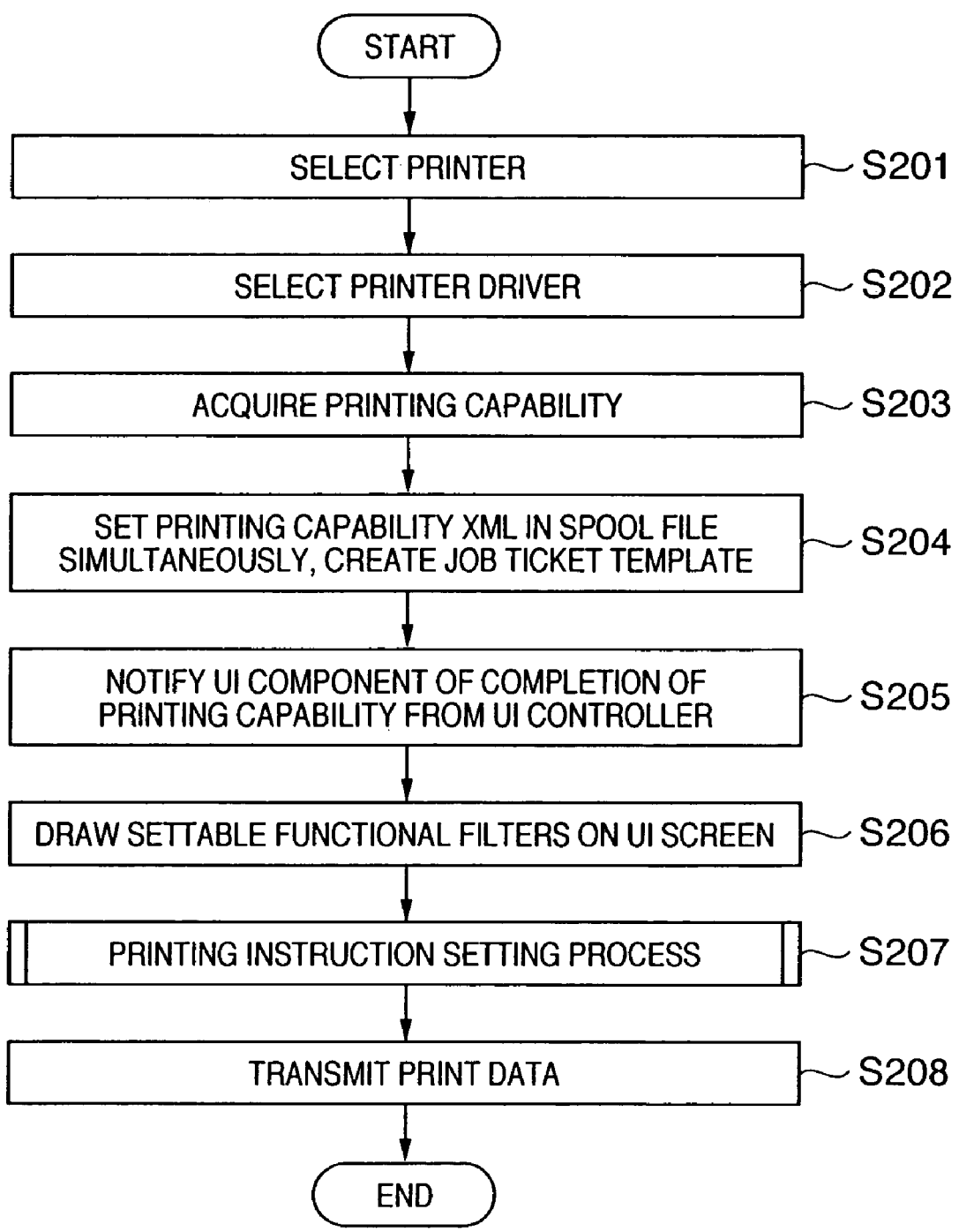
FIG. 2 is a flow chart illustrating a sample of a process according to the first embodiment.

First, as an initial matter, the procedure shown in FIG. 2 is started in a state in which an application program is activated and a printing instruction is issued. In such a state, the operator is permitted to select the printer to be used from the application (S201). In the event that the printer 120 connected to the computer 100 is the only one, then there is no room to select a different device. However, for example, a hypothetical printer for the purpose of outputting a PDF, if installed, can be selected.

When the printer is selected, the printer driver corresponding to the selected printer is selected (S202). When the printer driver is selected, the printing capability acquisition unit 108 of the printer driver UI component 105 acquires the printing capability information through the UI controller 111 (S203). In addition to the device 120 capability, the printing capability information also includes information indicting the printer driver capability. The acquired printing capability information is retained in the spool file 104 as a printing capability XML table. The printing capability XML table is a table in which the range of possible basic setting values and the usable functional filters are registered. The printing capability XML table indicates the printing capability. At the same time, a job ticket template is created based on that printing capability information (S204). It should be noted that, as for the printing capability, although it is acceptable to acquire information on the printing capability held by the device itself, information on the printing capability held statically by the selected printer driver, for example, may be acquired. For example, assume that values or the like for edge flags of the functional filter configuration tab contained in the printing capability XML table (that is, information expressing an order restriction on the functional filters) are linked with every functional filter and pre-registered in the order restriction table 121. The names of the functional filters and the values of the edge flags associated with them are registered in the order restriction table 121. Alternatively, this information may be retained by other methods, such as being held within each of the functional filters of the functional filter group 122. Those values are then read out as part of the printing capability information. A list of possible basic settings and functional filters are described in the printing capability XML table and the job ticket template.

FIG. 4 shows an example of a printing capability XML table 401 and a job ticket template 402. Usable paper sizes, maximum number of copies, possible paper orientations, usable functional filters and the like are included in the printing capability acquired in step S203. Values indicating the acquired printing capability are stored in the printing capability XML table 401 according to a configuration defined using XML (extensible Markup Language). In FIG. 4, the usable paper sizes are A4, A3, B4 and B3, the maximum number of copies is 1,000, and the possible paper orientations are vertical and horizontal. The usable functional filters are described in the Filter Name column. In FIG. 4, the usable functional filters are 4 up (also called 4 in 1, describing a layout that arranges four pages of the application on a single sheet), page number addition, copy-forgery-inhibited pattern, mask, stamp, and archive.

The edge flags (edge elements) are defined in the functional filters. The relation between the edge flags and the restrictions on order in the present embodiment are as follows:

(1) function with no special restriction: normal function (edge flag=0)

(2) function that must be performed at the end of a series of image processes: ending function (edge flag=1)

(3) function that must be performed at the beginning of a series of image processes: starting function (edge flag=−1)

(4) function that does not affect the preceding or succeeding image processes: unrestricted function (edge flag=−2)

In other words, the functional filter when the edge flag is 1 must be executed at the end of a series of functional filters (excluding any unrestricted functional filter), and the functional filter when the edge flag is −1 must be executed at the beginning of a series of functional filters (again excluding any unrestricted functional filter).

The Order element in the Filter Name column indicates the order of execution of the functional filters. Although the Order element is not used in the printing capability XML table and the job ticket template, a value corresponding to the order of execution is set in the job ticket.

The job ticket template, in contrast to the printing capability XML table which is comprised of printing capability tags, is comprised of job ticket tags. The job ticket template, with respect to the basic settings and the functional filters, has substantially the same configuration as that of the printing capability XML table. However, values indicating "default" are set in the basic settings such as the paper size, the number of copies and the paper orientation. When an actual job ticket is generated using this template, a value that is the equivalent of the default is substituted for the "default" item. Of course, alternatively, a default value itself may be set in place of "default". With regard to the functional filter configuration, the content is the same as with the printing capability XML table. The job ticket template thereafter changes to one in which setting values input by user instruction via the UI are substituted and the actual data of the job is inserted into the job ticket template or is linked, so as to become a job ticket that defines the content and format to be printed.

The printer driver UI component 105, when the printing capability XML table and the job ticket template are created and stored in the spool file 104, is notified from the UI controller 111 that printing capability acquisition is completed (S205). It is not necessary that the notification carried out in step S205 be carried out synchronously with the creation of the printing capability XML table and the job ticket template. For example, if the UI controller 111 has finished transmitting information relating to the printing capability to the printer driver UI component 105, the notification of completion may be sent at that time. The printer driver UI component 105, after the printing capability XML table and the job ticket template have been created, receives notification of completion of printing capability acquisition. In this case, it is presumed that inter-process asynchronous communication is possible.

When notified that acquisition of printing capability has been completed, the UI output unit 109 draws symbols expressing the settable (usable) functional filters on the printer driver UI screen (window) (S206). When the operator selects the functional filters and the like and sets the parameters on the printer driver UI screen, a preview display is executed by the functional filter controller 112 as well as the rendering processing unit 117 and the previewing unit 110 (S207). The content of step S207 is described with reference to FIG. 3. For example, with respect to items that can be set by the user, the name of each item and the corresponding settable boxes and settable candidate values are linked and displayed on the printer driver UI screen. On that screen, the user can input desired values or select from among the candidate values. The input values or the selected values are then reflected in the job ticket as setting values. With respect to the functional filters, the order of execution also can be specified. The specification of the order can be carried out, for example, by moving the tag for that name in a name list of functional filters, or by defining the specified order as is as the order of processing. Thereafter, in response to an instruction to execute printing from the user, in step S208 the print data is transmitted to the printer. As the print data, depending on the device, either a spool file containing the job ticket and the print data are transmitted as is to the device or the job ticket and the print data are converted to a device-specific PDL (Page Description Language) and transmitted to the device.

(Details of the Print Instruction Setting Process)

Figure 3:
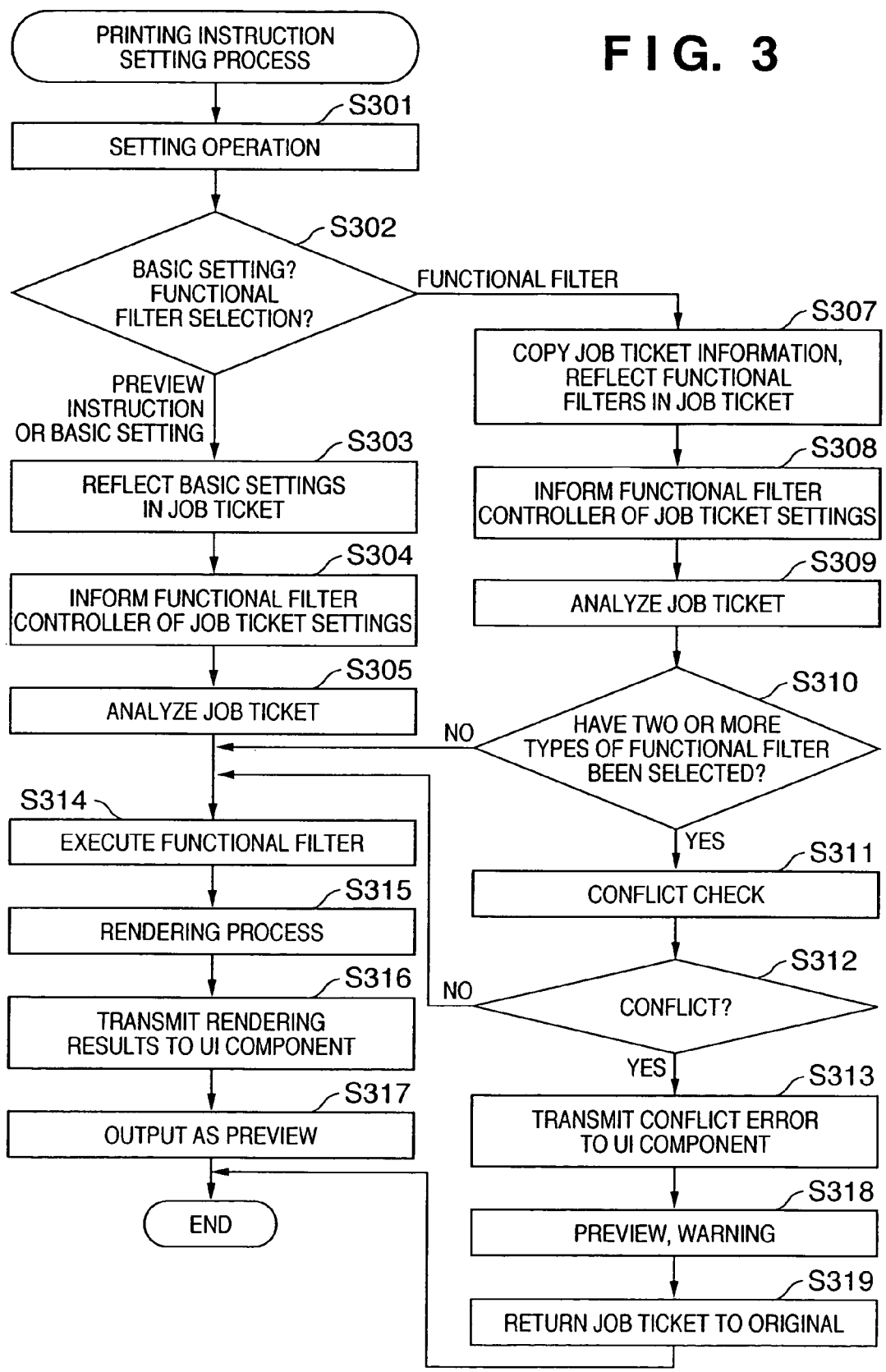
FIG. 3 is a flow chart illustrating a sample print instruction setting process according to the first embodiment.

FIG. 3 shows the details of the step S207 shown in FIG. 2. In FIG. 3, first, when the operator carries out setting operations using the printer driver UI screen (S301), a determination is made as to whether the operation carried out pertains to a basic setting operation, a preview display instruction, or a functional filter (S302). This determination can be accomplished by categorizing operations as either basic setting, functional filter or preview button for each item and determining to which category an item input by the operator belongs.

Figure 6:
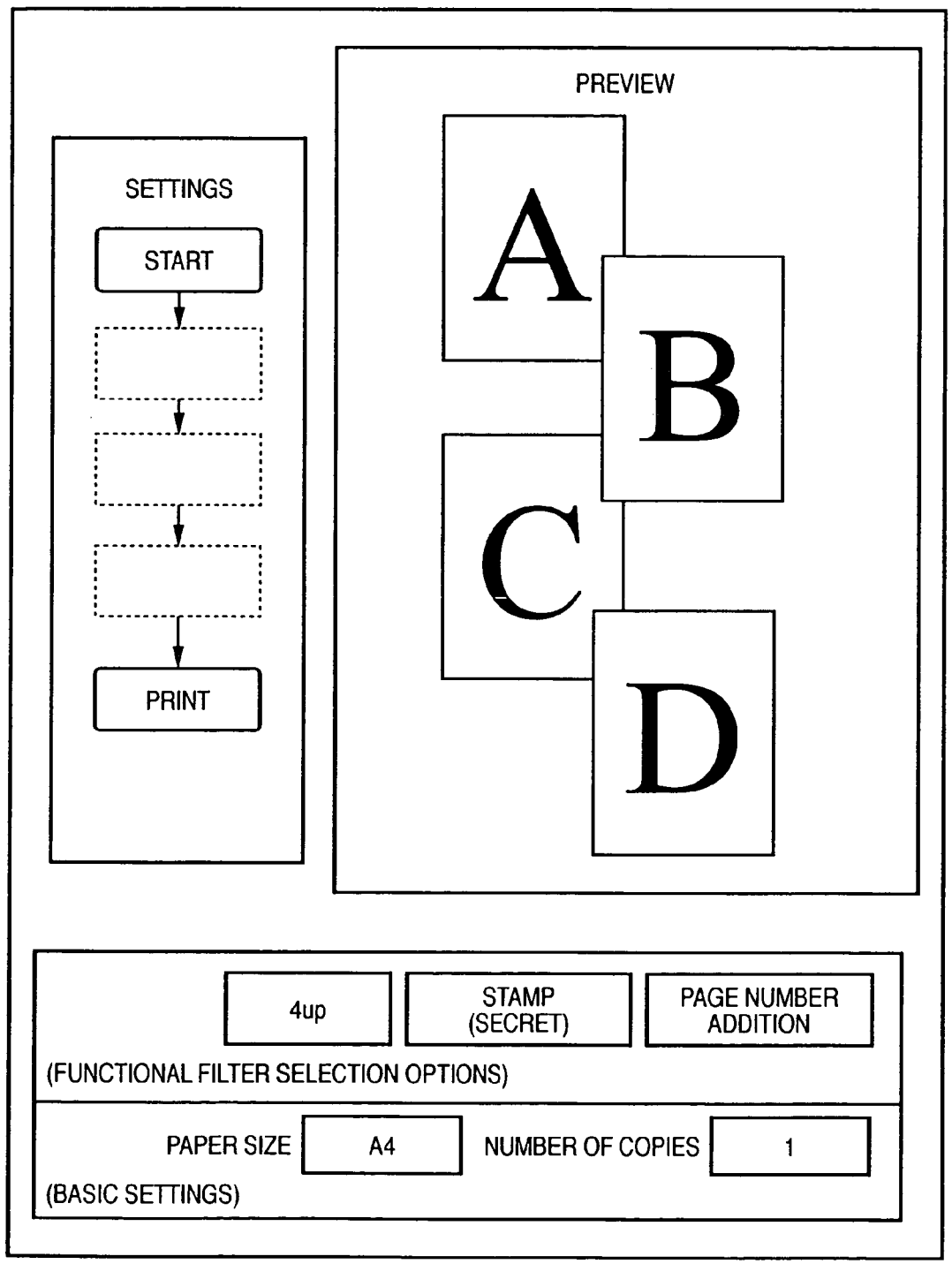
FIG. 6 is a schematic diagram of a sample preview during basic setting according to the first embodiment.

If the target operation is identified as a basic setting item or an instruction to preview, then the process diverges to step S303. In step S303, the printer driver UI component 105 causes the job ticket setting unit to reflect the paper size and the number of copies selected by the operator in the job ticket in the spool file 104 (S303). The job ticket is either the job ticket template 402 created in step S204 itself or a job ticket reproduced from the job ticket template 402. A value given as corresponding to "default" is then set in any item where the setting value for the print settings is "default". For example, paper size A4, number of copies 1 and paper orientation vertical are given as defaults. FIG. 5 shows an example of a job ticket. A job ticket 601 shown in FIG. 5 is created using the template 402 shown in FIG. 4, and default values are given for the basic settings. In addition, there are no settings for the functional filters. Although not shown in FIG. 5, in addition to these print settings print data is attached to the job ticket. The print data includes four pages of data as shown in FIG. 6 to be described later.

Next, the functional filter controller 112 is notified of the setting values for the functional filters set in the job ticket by the UI controller 111 (S304). This can be accomplished, for example, by transferring the entire contents of the basic setting tags and the functional filter configuration tags to the functional filter controller 112.

Once notified, the functional filter controller 112 accesses the job ticket in the spool file 104 through the spool file access processing unit 113. The accessed job ticket is rendered, for example, into a memory or the like, and the job ticket is analyzed by a job ticket analyzer 115 (S305). Then, the functional filter controller 112 executes the functional filters in the order specified based on the functional filter setting values (S314). By the execution of the functional filters, such processes are carried out as, for example, combining four pages in one page by conversion to 4 up, or adding page numbers. Then, based on the basic settings, the rendering processing unit 117 (S315) carries out rendering to generate image data that is to be previewed. It should be noted that steps S314, S315 may also be carried out for each page specified from among the preview target data.

Next, the rendering results (the image data for each page) are sent to the printer driver UI component 105 (S316), and the previewing unit 110 outputs the results as preview images (S317).

By contrast, if it is determined that the operator has performed functional filter selection on the printer driver UI screen, then the process diverges to step S307. In step S307, the printer driver UI component 105 causes the job ticket setting unit 107 to reflect instruction information of the functional filters that the operator has selected to be reflected directly in the job ticket in the spool file 104. In other words, the values expressing the order set on the UI are set in the Order element of each functional filter. At this time, for the process of S318 to be described later, the information of the original job ticket before reflecting the instruction information is copied to a RAM 202 or to the hard disk 211.

Then, the functional filter controller 112 is notified of the settings of the job ticket (the basic settings and the functional filter settings) by the UI controller 111 (S308). This can be accomplished, for example, by transferring the entire contents of the basic setting tags and the functional filter configuration tags to the functional filter controller 112.

Once notification of the settings of the job ticket is received, the functional filter controller 112 accesses the job ticket through the spool file access processing unit 113. Then, the job ticket analyzer 115 analyzes the job ticket (S309), checking whether or not two or more different types of functional filters have been selected (S310).

If in step S310 it is determined that two or more different types of functional filters have been selected, then the job ticket analyzer 115 carries out a functional filter conflict check (S311). An example of the structure of a conflict check is described below.

There exist functional filters whose orders of processing are always fixed. For example, the "copy-forgery-inhibited pattern (the pattern of ground added to printed matter)" functional filter is an ending functional filter to be always executed last in image processes. In this embodiment, in order to identify these types of necessarily ending functional filters and necessarily starting functional filters, edge flags (ending=1, starting=−1, all others=0) are retained as information in the spool file printing capability XML and the job ticket. A determination is made as to whether a selected functional filter is a trailing (ending) or a starting functional filter, as well as to whether or not a conflict has arisen on the basis of the edge flags.

For example, the edge flag of each functional filter included in the job ticket whose Order element is other than 0 is checked. For example, if the target of identification is a copy-forgery-inhibited pattern function filter, then, because the edge flag=1 it can be determined that the functional filter is an ending functional filter.

Next, that functional filter is inspected to determine whether or not it conflicts with restrictions given on the order of processing. If the functional filter does conflict with a restriction on order, then the results of the conflict check (S311) are that "there is a problem (conflict)". For example, assume that the target of inspection is an ending functional filter like the copy-forgery-inhibited pattern function filter. If there is a functional filter (to be referred as FA) whose order of execution is after the ending functional filter, and moreover if the functional filter FA is other than an unrestricted functional filter (whose edge flag value is 2), then it can be determined that there is a conflict. It should be noted that, if there is included in the job ticket a functional filter having a value for the Order element that is greater than the value for the Order element of the functional filter that is the target of a conflict check, then it can be determined that there exists a functional filter whose order of execution is after that of the functional filter that is the target of determination.

In addition, for example, assume that the target of inspection is a starting functional filter like a mask function filter. If there is a functional filter (to be referred as FB) whose order of execution is before that of the starting functional filter, and moreover if the functional filter FB is other than an unrestricted functional filter (whose edge flag value is 2), then it can be determined that there is a conflict. It should be noted that, if there is included in the job ticket a functional filter having a value for the Order element that is less than the value for the Order element of the functional filter that is the target of the conflict check, then it can be determined that there exists a functional filter whose order of execution is before that of the determination target functional filter.

If the results of the functional filter conflict check (S311) indicate that "there is no conflict", then the functional filters are executed in order based on the job ticket functional filter settings (S314). By executing the functional filters, such processes are carried out as, for example, combining four pages in one page by conversion to 4 up, or adding page numbers. Then, based on the basic settings, the rendering processing unit 117 (S315) carries out rendering to generate image data that is to be previewed. It should be noted that steps S314, S315 may also be carried out for each page specified from among the preview target data.

Next, the rendering results (the image data for each page) are sent to the printer driver UI component 105 (S316), and the printer driver UI component 105 previewing unit 110 outputs the results as preview images (S317).

By contrast, if, for example, a functional filter other than an unrestricted functional filter is set after an ending functional filter like the copy-forgery-inhibited pattern function filter has been set, then the results of the conflict determination are that "there is a conflict". In the event that "there is a conflict", the functional filter controller 112 notifies the printer driver UI component 105 of a conflict error (S313). The printer driver UI component 105 then displays the conflict error through the previewing unit 110 so as to notify the operator (S318), the process proceeds to S319, and the job ticket reflected in S307 is returned to the original job ticket based on the information copied to the RAM 202 or to the hard disk 211 in S307.

It should be noted that the processes shown in FIG. 3 are repeated each time the operator carries out a setting operation. Accordingly, where the UI screen and the preview screen are displayed together, the preview images are displayed in updated form each time the operator selects a functional filter.

Although in FIG. 3 a description is given of a preview process, it should be noted that the process is the same in the case of printing. However, in the case of printed output by the printer 120, the job ticket is processed according to the functions that the printer has. For example, where a printer that has a function that interprets the page description language and renders the image objects contained therein is used, after the execution of the functional filter in step S314, the print data is transmitted to the printer, without rendering, as PDL that the printer supports. If the printer does not have a rendering function and bit map data is provided to the printer, then processing is executed up to the rendering of step S315 shown in FIG. 3 and is transmitted as print data to the printer.

Thus, as described above, both a preview-displayed image as well as a print-output image become images that reflect the results of executing the specified functional filters in the specified order.

(Print Settings and Job Ticket, Preview Display Example)

A description will now be given of a specific example of the reflection of the print settings in the job ticket where a functional filter conflict has not occurred, with reference to FIGS. 7, 8 and 9.

It should be noted that, when a functional filter has not been selected, the value "0" is preset in the functional filter Order element during job ticket template creation. It should be noted that, in the following example, the order of execution of the functional filters is determined in accordance with the order selected by the operator.

Figure 7:
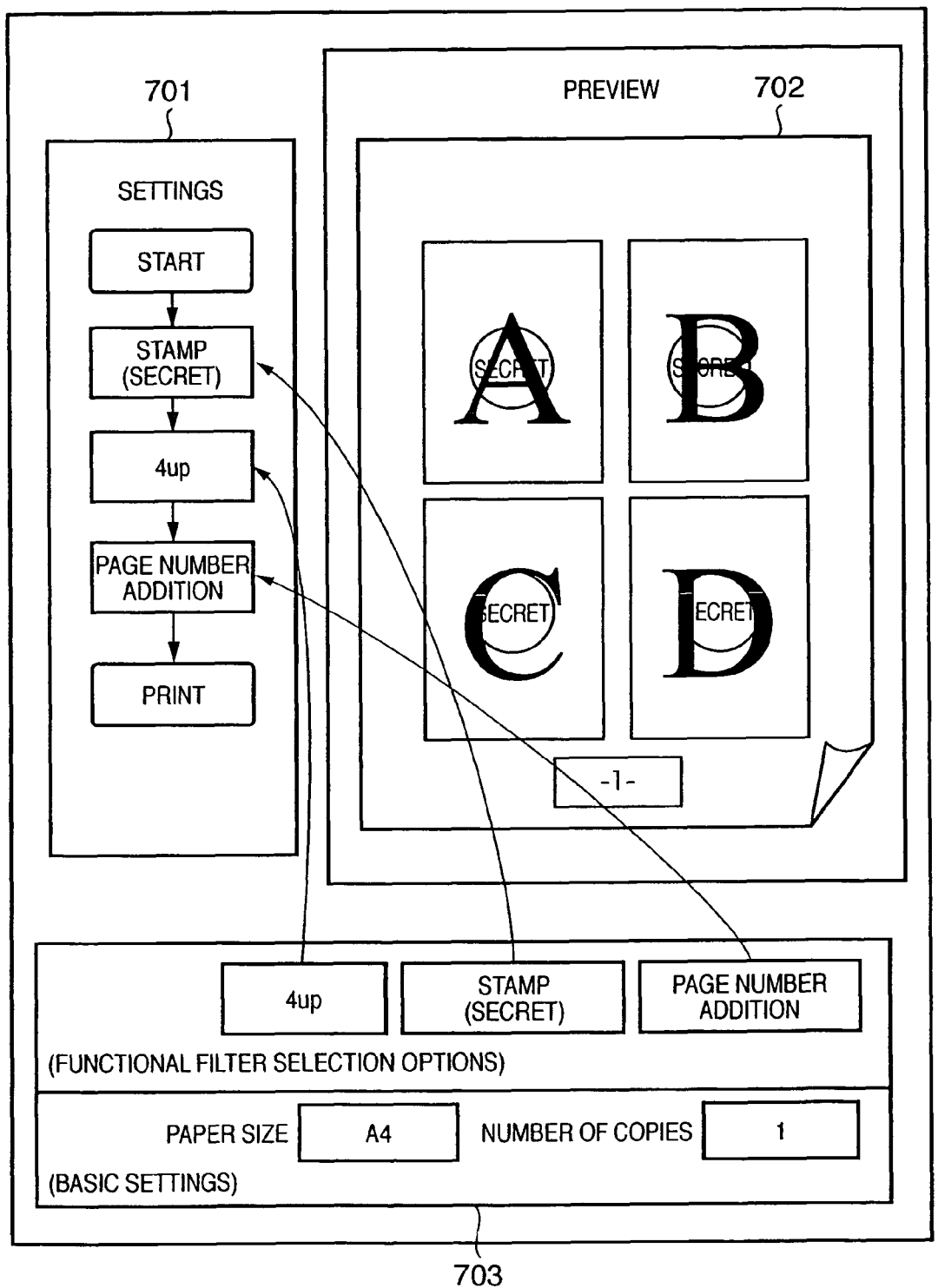
FIG. 7 is a schematic diagram of a sample preview during functional filter selection according to the first embodiment.

In FIG. 7, the operator manipulates a UI screen 703 and performs a setting operation in the order of an operation sequence 701. In other words, the user selects the functional filter in the order of "stamp (secret)"→"4 up"→"page number addition". Thereafter, an instruction to print is issued. It should be noted that, prior to printing, a preview display is always carried out.

At this time, a job ticket reflecting these print settings is a job ticket 901 shown in FIG. 9. A value indicating the set order is set in the order element of each functional filter (sometimes also called order attributes) in the job ticket 901. In the job ticket 901, the value for the "stamp (secret)" order element is 1, the value for the "4 up" order element is 2, and the value for the "page number addition" is 3.

As a result, first, a preview image stamped "secret" on each page of four pages written A, B, C, D by selection of the stamp is generated. Next, a preview image converted to a 4 up layout by selection of 4 up, in which four pages are arranged on a single page, is generated. Finally, by selection of page number insertion, a preview image 702 with the page number "1" added to the post-4 up single page is generated. Of course, the image to be printed also is the same as the preview image. Moreover, if the UI screen and the preview screen are displayed together on the display, there is no preview after execution of the final functional filter. Instead, the preview image is updated with each selection of the functional filters.

Figure 8:
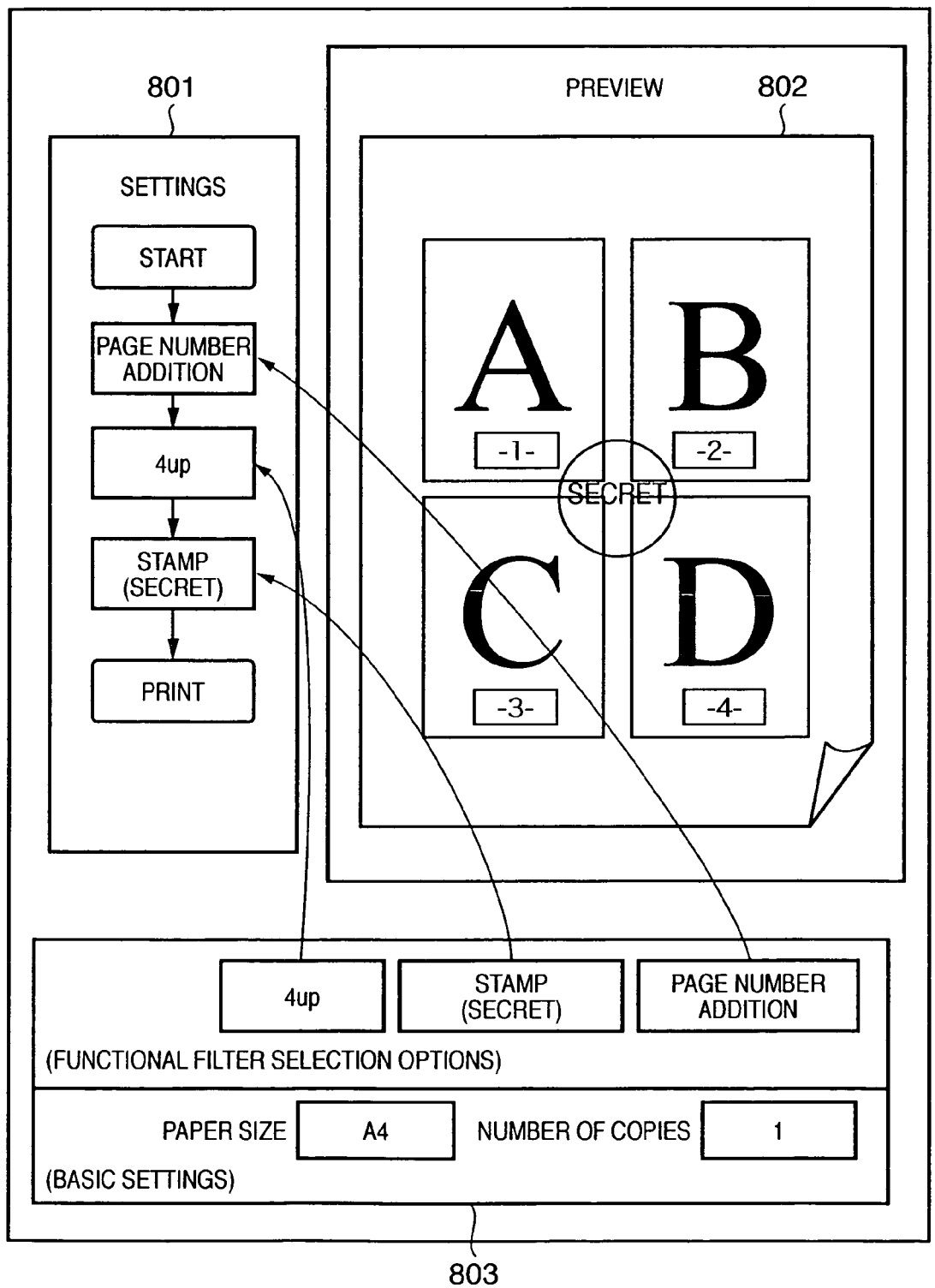
FIG. 8 is a schematic diagram of a sample preview during functional filter selection according to the first embodiment.

FIG. 8 shows another example in which the order of the functional filters is different. In FIG. 8, the operator manipulates the UI screen 803 and performs a setting operation in the order of an operation sequence 801. In other words, the operator selects functional filters in the order "page number addition"→"4 up"→"stamp (secret)". Thereafter, an instruction to print is issued. It should be noted that, prior to printing, a preview display is always carried out.

At this time, a job ticket reflecting these print settings is a job ticket 902 shown in FIG. 9. A value indicating the set order is set in the order element of each functional filter (sometimes also called order attributes) in the job ticket 902. In the job ticket 902, the value for the "page number addition" order element is 1, the value for the "4 up" order element is 2, and the value for the "stamp (secret)" is 3.

As a result, a preview image 802 is generated in which, first, page numbers "1" through "4" are added to each page of the four pages written as A, B, C, D by selection of the page insertion, the four pages are arranged on a single page in a 4 up layout by selection of 4 up, and the post-4 up single page is stamped "secret" by selection of the stamp. Of course, the image to be printed also is the same as the preview image.

A specific example of a job ticket in which an ending functional filter with an order restriction is used as the functional filter will now be described using FIGS. 10, 11 and 12. In the following example, the order of the functional filters is determined according to the order selected by the operator.

Figure 10:
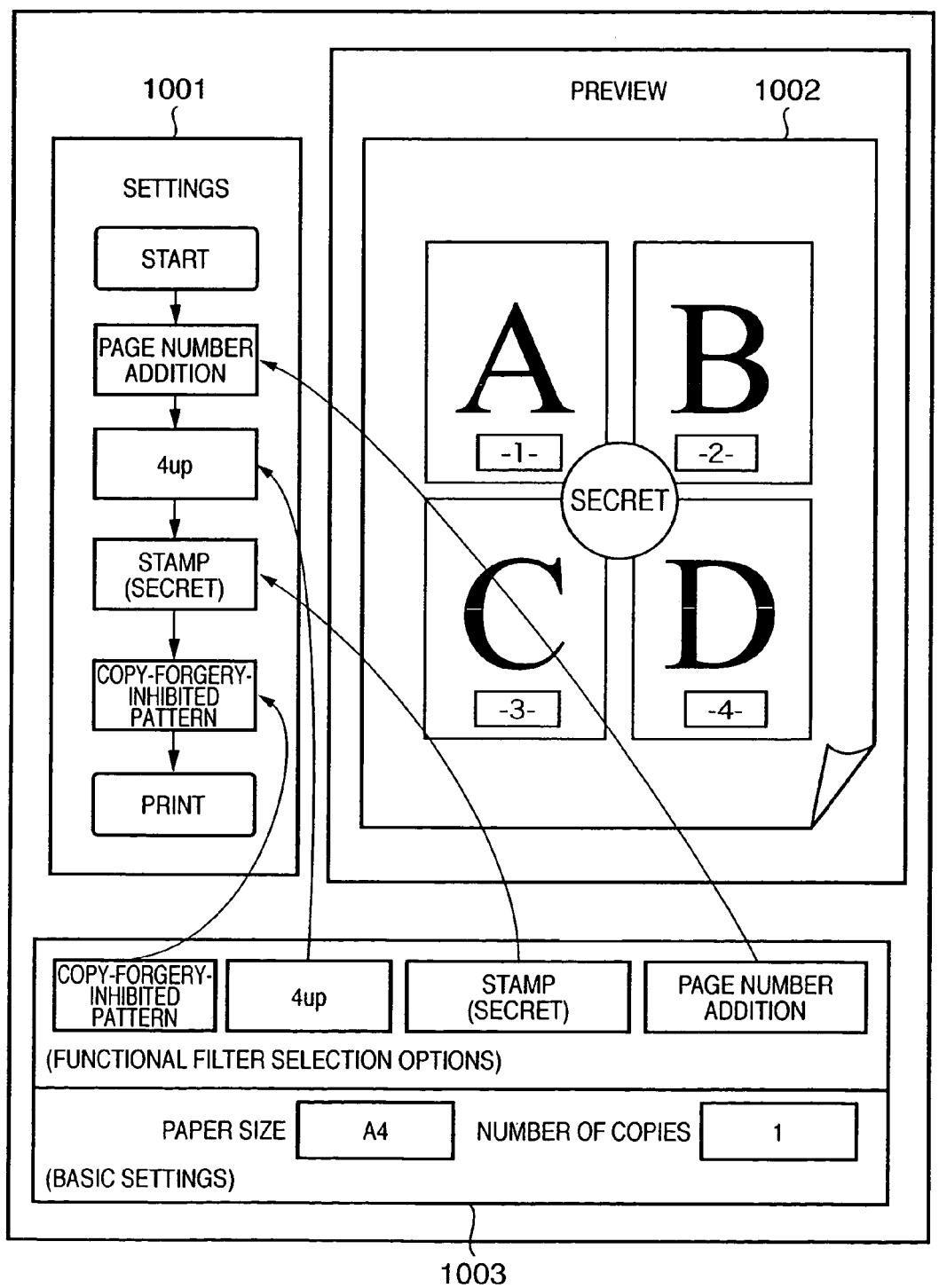
FIG. 10 is a schematic diagram of a sample preview during functional filter selection according to the first embodiment.

In FIG. 10, the operator manipulates a UI screen 1003 to perform a setting operation in the order of an operation sequence 1001. In other words, the operator selects the functional filters in the order "page number addition"→"4 up"→"stamp (secret)"→"copy-forgery-inhibited pattern". Thereafter, an instruction to print is issued. It should be noted that, prior to printing, a preview display is always carried out. At this time, a job ticket reflecting these print settings is a job ticket 1201 shown in FIG. 12. A value indicating the set order is set in the order element of each functional filter in the job ticket 901. In the job ticket 1201, the value for the "page number addition" order element is 1, the value for the "4 up" order element is 2, the value for the "stamp (secret)" order element is 3, and the value for the "copy-forgery-inhibited pattern" order element is 4.

As a result, a preview image is generated and displayed in which, first, page numbers "1" through "4" are added to each page of the four pages written as A, B, C, D by the selection of the page number insertion, the four pages are converted to a 4 up layout in which the four pages are arranged in a single page by the selection of 4 up, and a copy-forgery-inhibited pattern is added to the post-4 up single page by selection of copy-forgery-inhibited pattern. Of course, the image to be printed also is the same as the preview image. It should be noted that, although on the UI (as well as on the printed output), the copy-forgery-inhibited pattern is added to the entire page, in terms of the processing, a lossless compression process is carried out for the compression process performed after the copy-forgery-inhibited pattern is added.

Figure 11:
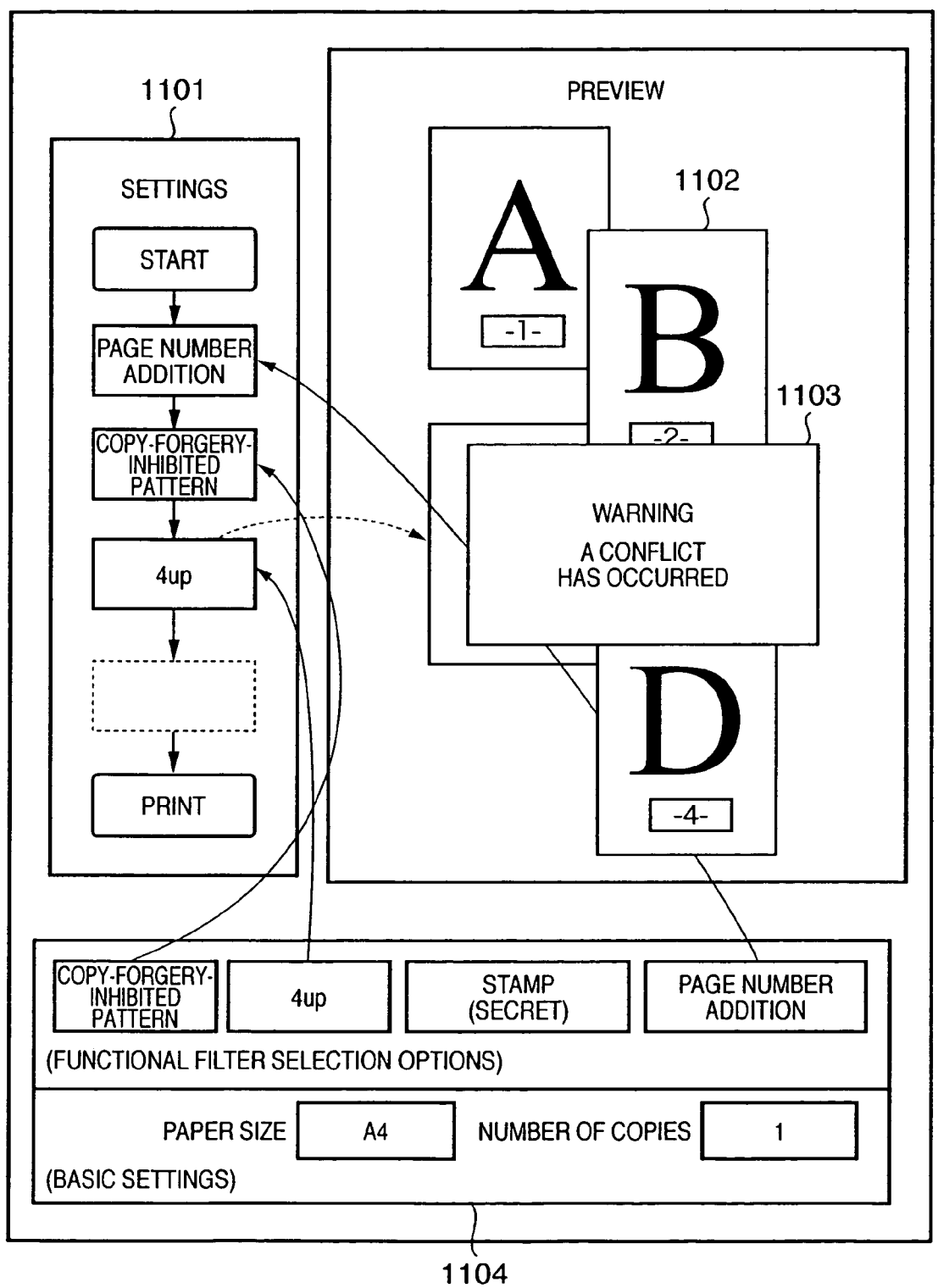
FIG. 11 is a schematic diagram of a sample preview during conflict according to the first embodiment.

FIG. 11 shows an example of a conflict in the order of the functional filters. In FIG. 11, the operator manipulates a UI screen 1104 and performs a setting operation in the order of an operation sequenced 1101. In other words, the operator selects the functional filters in the order of "page number addition"→"copy-forgery-inhibited pattern"→"4 up". Thereafter, an instruction to print is issued.

At this time, the job ticket that reflects these print settings is a job ticket 1202 shown in FIG. 12. A value indicating the set order is set in the Order element of each functional filter (sometimes also called order attributes) in the job ticket 1202. In other words, the order of the functional filters specified through the user interface is saved. In the job ticket 1202 shown in FIG. 12, the value for the "page number addition" order element is 1, the value for the "copy-forgery-inhibited pattern" order element is 2, and the value for the "4 up" is 3.

As a result, first, page numbers "1" through "4" are added to each page of the four pages written as A, B, C, D, by the selection of the page number insertion and a copy-forgery-inhibited pattern is added to the four pages by selection of copy-forgery-inhibited pattern. Then, by selection of 4 up, the normal function 4 up functional filter comes to exist after an ending functional filter. Accordingly, a conflict is detected and a warning message 1103 is output (displayed) without executing the process of the final "4 up" functional filter and without changing the post-4 up preview image 1102 to the preview shown in FIG. 12.

Thus, as described above, the operator is allowed to select the order of additional image processing functions (functional filters) to be executed by the printer driver, and can preview the image according to the selected order to be displayed and printed. Accordingly, the range of expression using image processing functions can be expanded. Furthermore, if there are restrictions on the order of the image processing functions to be used, a check is performed to ascertain whether or not the specified order complies with the restrictions. As a result, output (either printing or display) of an image that differs from the image that can be expected to be obtained from the set image processing functions can be avoided. In addition, the operator can be informed promptly of an erroneous setting, thus improving operability.

In addition, in order to determine the presence of order specifications that do not comply with order restrictions based on the values of the order elements of the functional filters registered in the job ticket, the present embodiment enables the determination of compatibility with restrictions on order no matter what kind of print setting UI may be involved.

Second Embodiment

Among functional filters, there are those, such as "copy-forgery-inhibited pattern", whose order of processing is always fixed. For example, "copy-forgery-inhibited pattern" filter is always executed last in an image processing. If the operator is prevented from further operation of the print setting UI after such an ending functional filter is selected, restrictions on order can be provided even more rationally. In addition, conversely, preventing the operator from selecting a starting functional filter after selection of a functional filter other than an unrestricted functional filter also can provide a simple restriction on order. The present embodiment presumes a printing system that uses a user interface in which the operator's order of selection of the functional filters is set in the job ticket as the order of execution of the functional filters. A printing system that determines in a simple manner the compliance of the specified order of execution with restrictions on the order of execution of the functional filters while employing such a user interface is described in the present embodiment, a specific example of which is described below with reference to FIG. 13. It should be noted that the configuration of the system is as shown in FIG. 1, and the printing system as a whole is as shown in FIG. 2. In addition, the configurations of the job ticket, the user interface and the preview screen also are as shown in FIGS. 4 through 12. In other words, the present embodiment is implemented by the execution of the procedure shown in FIG. 13 as step S207 shown in FIG. 2 of the first embodiment.

Figure 13:
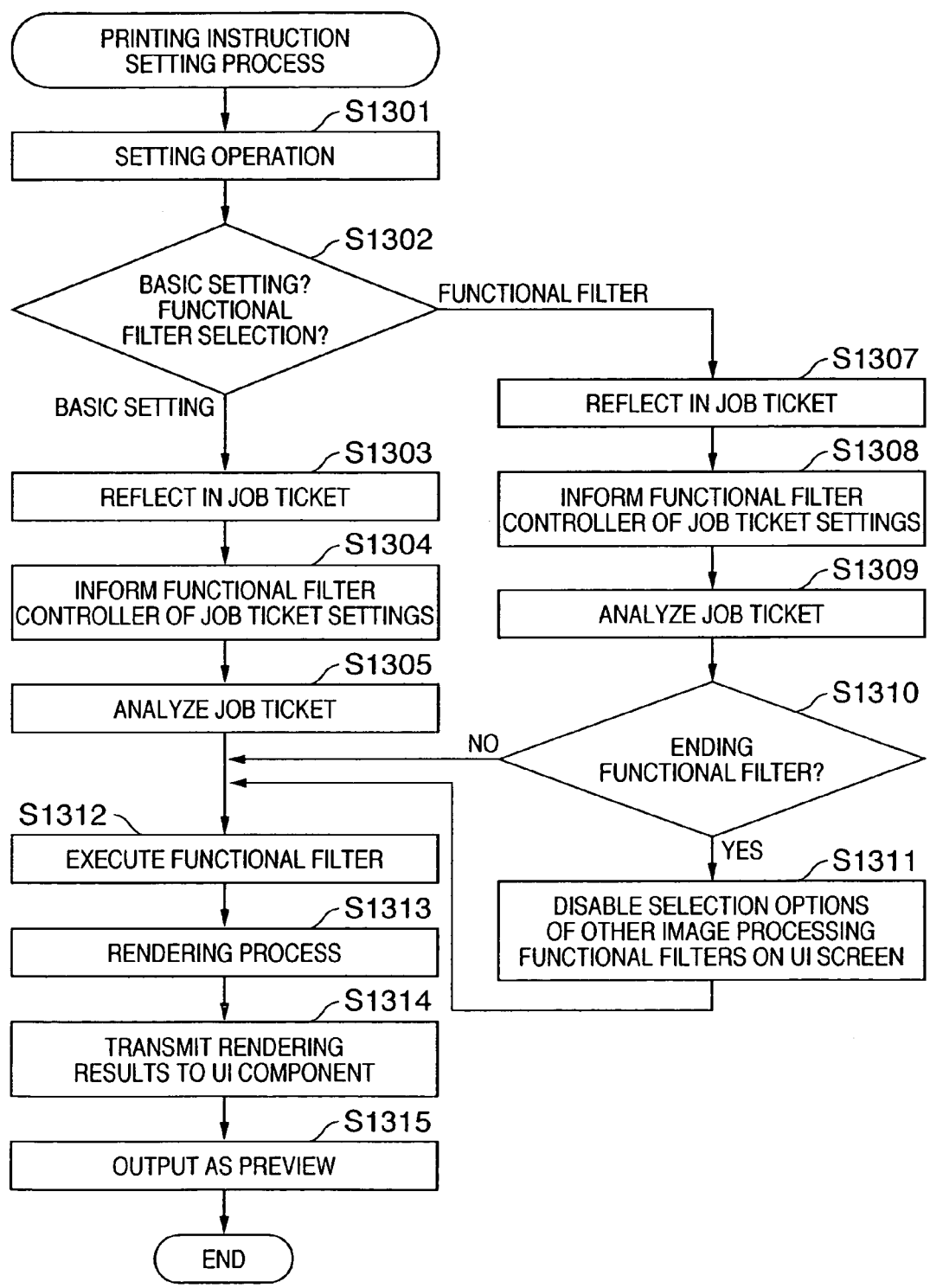
FIG. 13 is a flow chart illustrating a sample of a print instruction setting process according to a second embodiment.

In FIG. 13, if the operator carries out the basic settings on the printer driver UI screen, the process proceeds to step S1303. Step S1303 through step S1315 are the same as step S303 through step S317 shown in FIG. 3.

By contrast, if in step S1302 it is determined that the operator has selected a functional filter on the printer driver UI screen, then the process branches to step S1307. Step S1307-S1309 are the same as steps S307-S309 shown in FIG. 3.

In step S1301, as a result of an analysis of the job ticket in step S1309, a check is made to determine whether or not the functional filter set by such operation is an ending functional filter. In the case of a functional filter that is always at the end, the spool file printing capability XML and the job ticket edge flags (ending=1, starting=−1, all others=0) are retained as information, on the basis of which the identification of the functional filter as an ending functional filter or not is carried out. This identification can be achieved, for example, by determining if the value of the Order element of the ending functional filter included in the job ticket is something other than 0, that is, if there is a functional filter in which the edge flag=1 and the Order element≠0.

For example, if the "copy-forgery-inhibited pattern" functional filter is selected, the edge flag is checked and as a result it is determined that that copy-forgery-inhibited pattern filter is ending functional filter having an edge flag being equal to 1.

Figure 14:
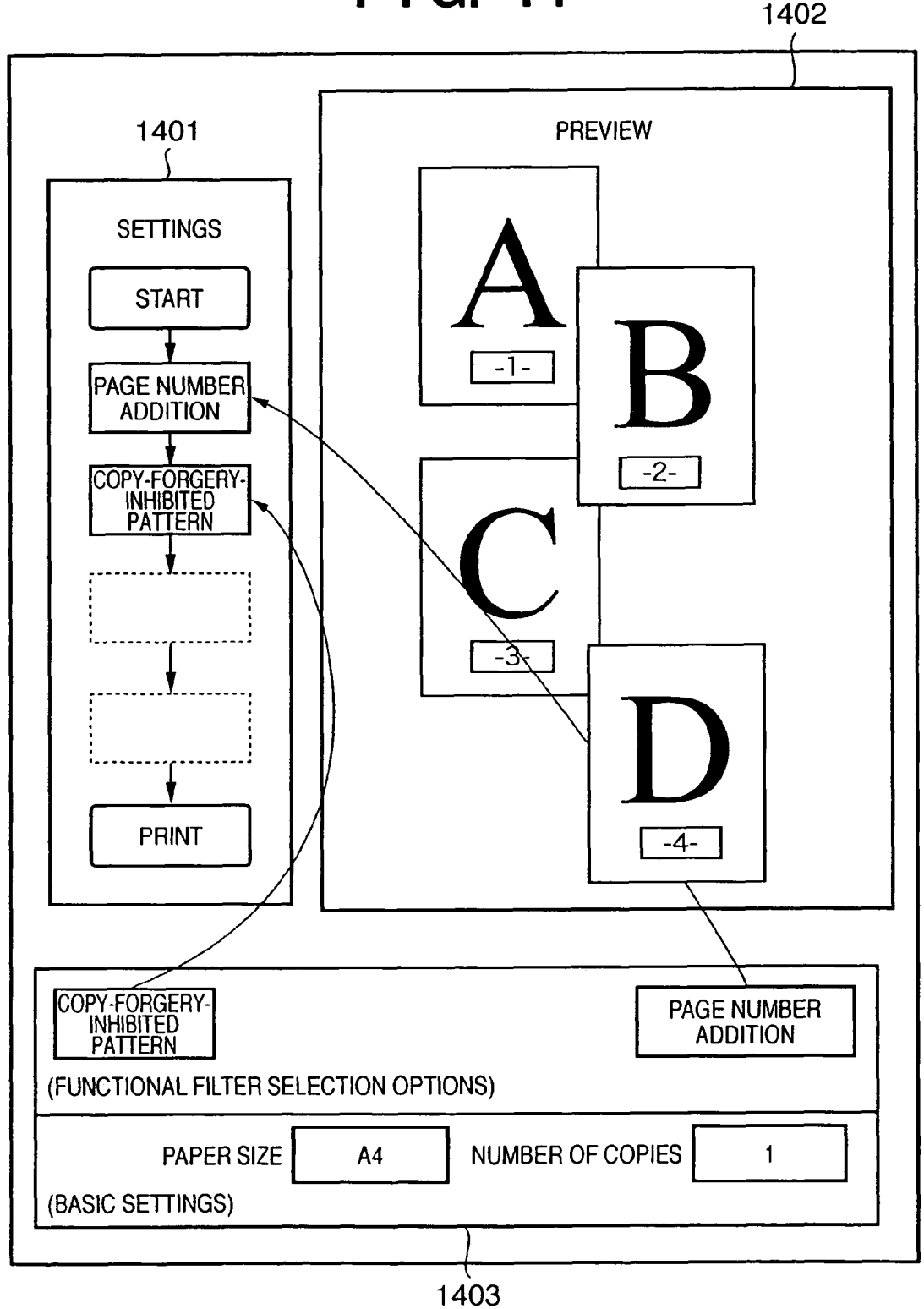
FIG. 14 is a schematic diagram of a sample preview during basic setting according to the second embodiment.

If an ending functional filter is set as the last process in the job ticket, the functional filter controller 112, through the UI controller 111, disables the option of selecting other image processing functional filters (except for unrestricted functional filters) on the UI screen. As a result, the user is prevented from setting a functional filter of an order after this one. The functional filter selection option on the UI screen may be disabled by the following two methods, for example:

(1) As shown in FIG. 14, the option of selecting other image processing functional filters is deleted from the UI screen. FIG. 14 shows an example thereof. As a result of the copy-forgery-inhibited pattern function filter being selected as with a procedure 1401, the other functional filters can no longer be selected. However, although a previously selected page number addition function filter and copy-forgery-inhibited pattern function filter are displayed on a UI 1403, this is for explanatory convenience only, and these, too, are not displayed and cannot be selected.

Figure 15:
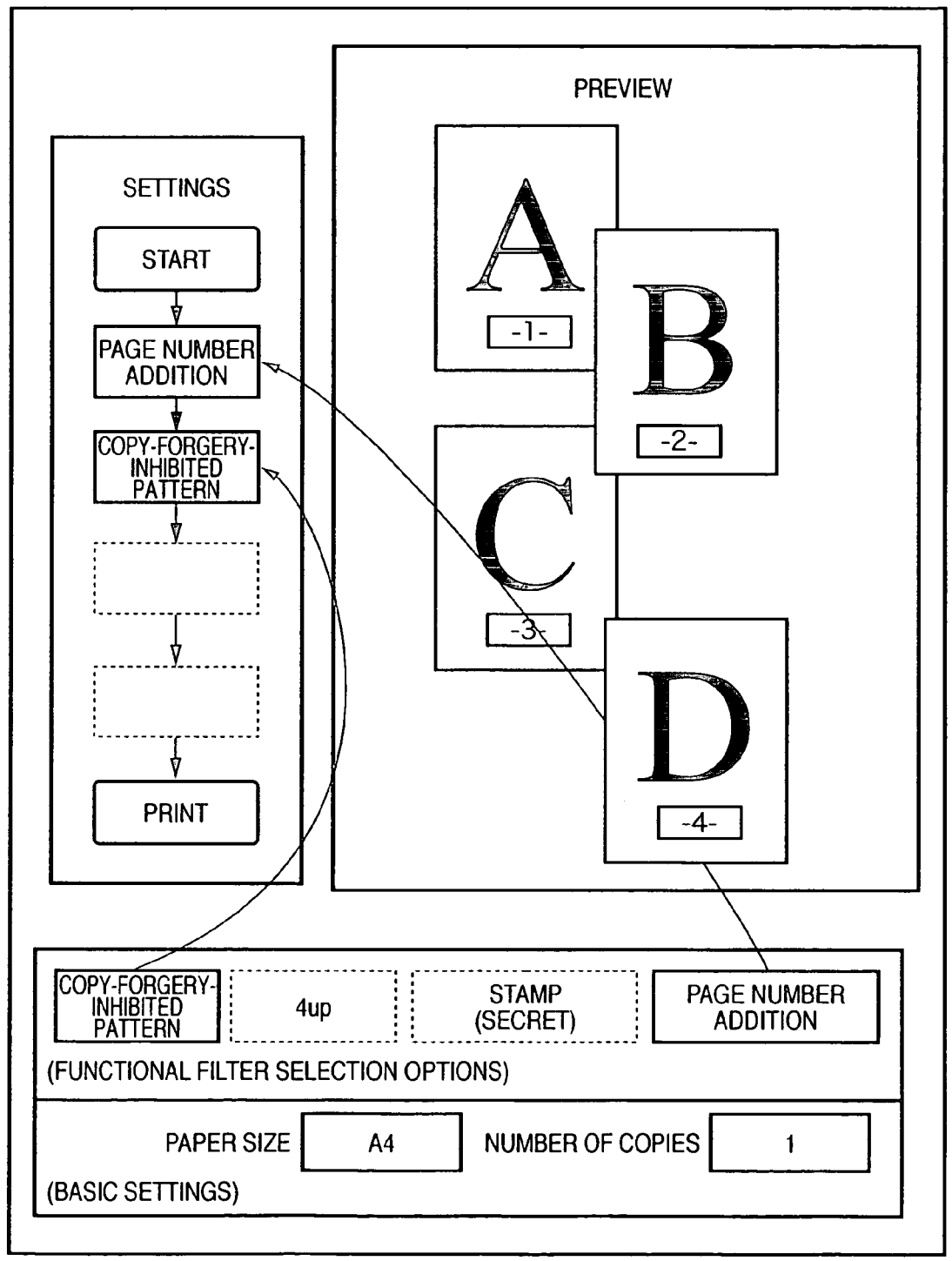
FIG. 15 is a schematic diagram of a sample preview during basic setting according to the second embodiment.

(2) As shown in FIG. 15, the disabled option of selecting other image processing functional filters is shaded gray (shown by areas enclosed by dotted lines in FIG. 15). Options that are shaded gray cannot be selected. In FIG. 15 as well, the copy-forgery-inhibited pattern and the page number function filters are grayed-out and can no longer be selected.

Preferably, with such methods, a release button is provided on the UI screen and all functional filter selections can be released by pressing the release button.

It should be noted that although in the example shown in FIG. 13 only an ending functional filter is described, the process is the same for a starting functional filter as well. With respect to a starting functional filter, for example, in step S1301 shown in FIG. 13, it is determined whether or not a functional filter other than an unrestricted functional filter has already been selected, in other words, a functional filter with an edge flag≠2 and an Order element≧1. Then, in some cases, in step S1311, functional filters with an edge flag=−1 are either erased from the UI or grayed-out and disabled.

Thus, as described above, the printing system of the present embodiment makes it possible to check by a simpler procedure if the order of execution of the set image processing functions complies with order restrictions.

Third Embodiment

In this embodiment, when an add-in function filter (a functional filter added later) is added to the printer driver, for that add-in function filter as with other functional filters the operator is allowed to set the printing process parameters while visually checking the difference in output results according to the order of processes.

A specific example is shown below. It should be noted that, in this embodiment, the configuration of the printing system and the printing process content itself are the same as with the first embodiment and the second embodiment. However, for the add-in function filter, values for the edge flags that are linked to the add-in function filter can be registered in the order restriction table 121. It should be noted that, in this example, functional filters known to have special order restrictions, such as starting and ending, retain edge flag settings inside the filters as special order restriction information.

First, a description will be given of the structure of the order restriction table 121, with reference to FIG. 17. The names of the functional filters (for example, 4 up) and the edge flag values linked to those functional filters (for example 0) are registered in the order restriction table 121. It should be noted that, for the sake of illustration, FIG. 17 shows the content of an order restriction table for a standard functional filter that is not an add-in function filter. Of course, in this manner edge flag values for standard functional filters also may be registered in the order restriction table 121 as described above.

Figure 16:
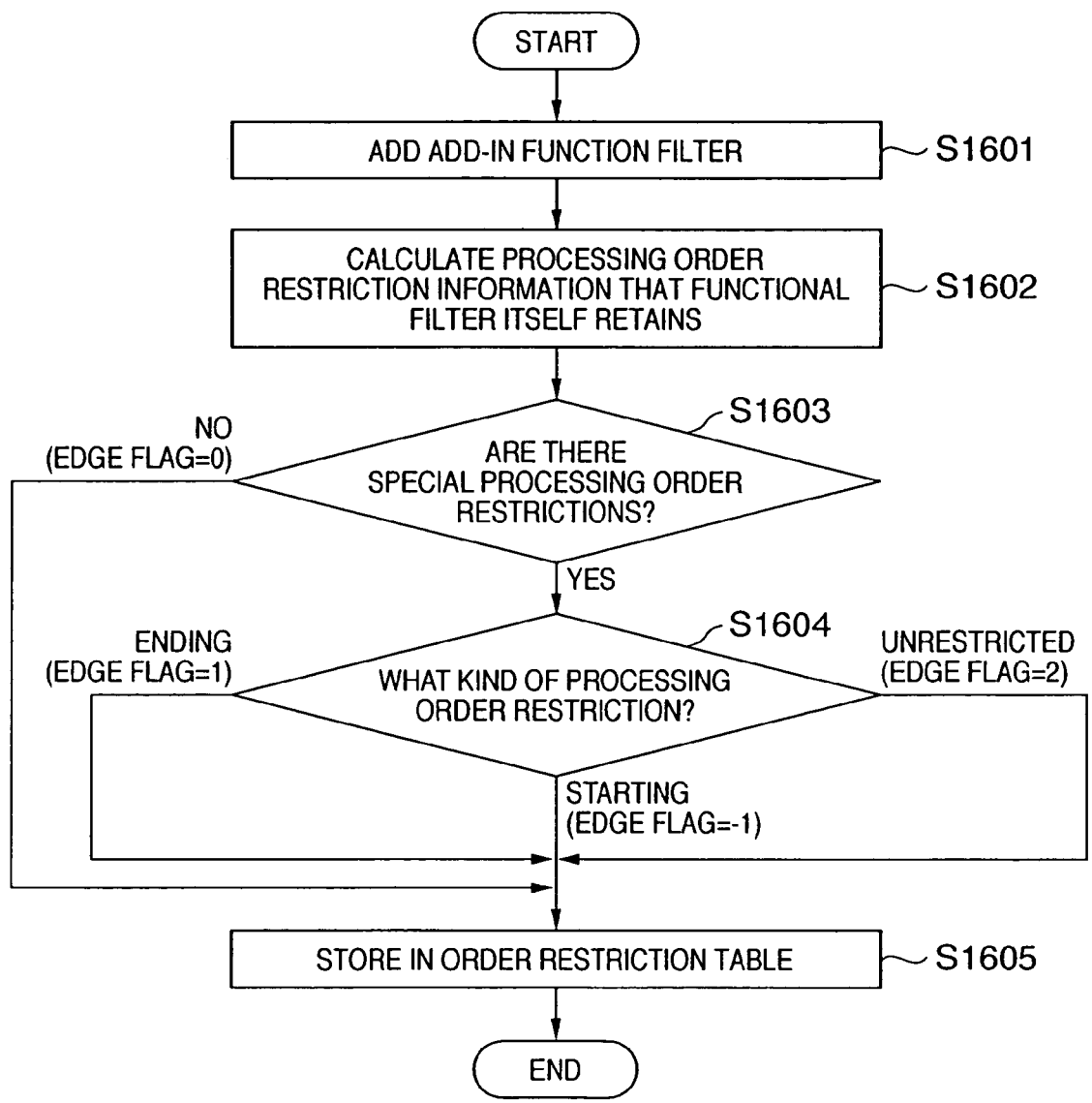
FIG. 16 is a flow chart illustrating a sample of a process according to a third embodiment.

In FIG. 16, first, an add-in function filter is added to the printer driver function library (S1601). This addition is carried out according to operations from a UI provided by the printer driver UI component 105, for example. At this time, the functional filter configuration manager 118 detects any special restriction information on the order of processing (edge flags) that the added functional filter itself holds (step S1602). What the functional filter itself holds are functional filter programs, for example, or data in which restriction information is pre-written. The order restriction information may be given, for example, as attribute values other than edge flags. In any case, as with the first embodiment, functional filters like the following are retained so as to be identifiable.

(1) function with no special restriction: normal function (edge flag=0)

(2) function that must be performed last as an image process: ending function (edge flag=1)

(3) function that must be performed first as an image process: starting function (edge flag=−1)

(4) function that does not affect the preceding or succeeding image processes (that is, a function that may come before a starting functional filter or after an ending functional filter): unrestricted function (edge flag=2).

Then, in step S1603, it is determined whether or not the detected (read) restriction information (edge flag) corresponds to (1) of the foregoing four types of functions (that is, if the edge flag=0). If it is determined that there are no special order restrictions on the add-in function filter, then "edge flag=0" as special restriction information on the order of processing is linked to the name or other such identifier of the added functional filter and stored in the order restriction table 121 of the printer driver function library 119 by the functional filter configuration manager 112 (S1605). This functional filter information is also reflected in the printing capability XML (printing capability table) created by the processing procedure shown in FIG. 2, as well as in the edge flags of the printing capability XML and the job ticket template that is based on that printing capability XML. In other words, the names as well as the Order elements and edge flags of the added functional filters are included in the created printing capability XML and the job ticket template based on that printing capability XML.

By contrast, if it is determined in step S1603 that the add-in function filter is a functional filter that has restrictions on order (that is, the edge flag≠0) such as, for example, a copy-forgery-inhibited pattern function filter, then in step S1605 it is further determined what type of order restriction is in place, in other words, to which of the types (2) through (4) described above do the order restrictions correspond.

In the case of the copy-forgery-inhibited pattern function filter, the copy-forgery-inhibited pattern function filter is performed last as an image process, and "edge flag=1" is embedded in the functional filter itself as processing order restriction information. In addition, if the add-in function filter is, for example, a "mask" function (a process that covers a particular location by painting out or the like) filter, then that add-in function filter is carried out first as an image process, and therefore "edge flag=1" is embedded in the functional filter itself as processing order restriction information. In addition, if, for example, the add-in function filter is an "archive" function (a process of storing separately as recorded data) filter, such a functional filter does not affect the preceding or the succeeding image processes, and therefore "edge flag=2" is embedded in the functional filter itself as processing order restriction information.

In any case, the value of the edge flag as special restriction information for the order of processing is linked with the name or other such identifier of the added functional filter and stored in the order restriction table 121 of the printer driver function library 119 by the functional filter configuration manager 112 (S1605). This functional filter information is also reflected in the printing capability XML (the printing capability table) created by the processing procedure shown in FIG. 2 as well as in the edge flags of the printing capability XML and the job ticket template that is based on that printing capability XML. In other words, the names as well as the Order elements and edge flags of the added functional filters are included in the created printing capability XML and the job ticket template based on that printing capability XML.

It should be noted that, in FIG. 16, the edge flag detected in step S1602 may be linked as is with the functional filter name and saved in the order restriction table 121 in step S1605. In addition, where the restriction information is given in a form or a value other than that of an edge flag, depending on the results of the determinations made in step S1603 and step S1604, a value is set in the edge flag as per types (1) through (4) described above. That value is then stored in the order restriction table 121 in step S1605.

Then, for an add-in function filter added in the foregoing manner, by a procedure identical to that of the first embodiment or the second embodiment, the operator is warned if there is a conflict with the order restrictions, operator-induced function addition operations are restricted, and printing and preview display including the addition functional filter can be carried out.

The present embodiment enables the operator to specify the order of execution of an added functional filter that is not installed as standard just as with a standard functional filter. In addition, a warning is output if the order of execution of the added functional filter conflicts with restrictions on functional filter processing order, or operations that select functions that conflict with the order can be disabled. In addition, the output product as specified can be previewed and/or printed. It should be noted that although in the foregoing embodiments a "4 up" functional filter is described, in actuality the functional filter may be a 2 up, 6 up, 8 up, or 9 up, and moreover, the invention allows one of the aforementioned to be selectively specified.

Thus, as described above, the following effects are achieved by the first through third embodiments:

(1) The operator can set the printing process parameters while visually checking differences in output results due to the order of processes.

(2) A preview of the predicted printed results is displayed each time the order of the functional filters is set, enabling the operator to check/set the functions and the processing order while viewing a preview of the predicted printed results.

(3) Output results intended by the user can be obtained.

(4) Where an add-in function filter (a functional filter that is added later) is added to the printer driver, for that add-in function filter as with the other functional filters, the operator can set the printing process parameters while visually checking differences in output results due to the order of processes.

(5) Operability is improved by preventing the operator from making further selections once the operator has selected functional filters whose order of image processing is fixed.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

Claim of Priority

This application claims priority from Japanese Patent Application No. 2004-231436 filed on Aug. 6, 2004, which is hereby incorporated by reference herein.

What is claimed is:

1. An information processing apparatus comprising:
a display unit constructed to display a window for displaying print functions, a setting window for setting an execution order of the print functions and a preview window for displaying a print result obtained by executing the print functions in the execution order set via the setting window, wherein for each of the print functions, a flag indicating that the print function is a normal function without any restriction, a flag indicating that the print function must be executed at the end of the print functions, a flag indicating that the print function must be executed at the beginning of the print functions, or a flag indicating that the print function does not affect the preceding or succeeding processes, is defined;
a transmission unit constructed to transmit to a printing apparatus print data by which the print functions are executed in the execution order set via the setting windows;
a determining unit, constructed to determine based on the flags whether a problem will occur or not when the print functions are executed in the execution order set via the setting window, wherein said determination unit determines that the problem occurs in a case when there is an extra print function after a print function with a flag indicating that the print function must be executed at the end of the print functions and, for the extra print function, a flag other than a flag indicating that the extra print function does not affect the preceding or succeeding processes is defined, or in a case when there is an extra print function before a print function with a flag indicating that the print function must be executed at the beginning of the print functions and, for the extra print function, a flag other than a flag indicating that the extra print function does not affect the preceding or succeeding processes is defined; and a warning unit, constructed to output a warning if said determination unit determines that a problem will occur when the print functions are executed in the execution order set via the setting window.

2. The apparatus according to claim 1, wherein said display unit does not display a non-selected function in the setting window after a function to be executed finally has been selected in the setting window.

3. The apparatus according to claim 1, wherein said display unit displays a non-selected function in a manner that the non-selected function cannot be selected in the setting window after a function to be executed finally has been selected in the setting window.

4. The apparatus according to claim 1, wherein, in the setting window, said display means disables selection of a print function for which a flag other than the flag indicating that the print function does not affect the preceding or succeeding processes is defined after selection of a print function for which either the flag indicating that the print function must be executed at the beginning of the print functions or the flag indicating that the print function must be executed at the end of the print functions is defined.

5. An information processing method comprising:
displaying a window for displaying print functions, a setting window for setting an execution order of the print functions and a preview window for displaying a print result obtained by executing the print functions in the execution order set via the setting window, wherein for each of the print functions, a flag indicating that the print function is a normal function without any restriction, a flag indicating that the print function must be executed at the end of the print functions, a flag indicating that the print function must be executed at the beginning of the print functions, or a flag indicating that the print function does not affect the preceding or succeeding processes, is defined;

transmitting to a printing apparatus print data by which the print functions are executed in the execution order set via the setting windows;

determining based on the flags whether a problem will occur or not when the print functions are executed in the execution order set via the setting window, wherein it is determined that the problem occurs in a case when there is an extra print function after a print function with a flag indicating that the print function must be executed at the end of the print functions and, for the extra print function, a flag other than a flag indicating that the extra print function does not affect the preceding or succeeding processes is defined, or in a case when there is an extra print function before a print function with a flag indicating that the print function must be executed at the beginning of the print functions and, for the extra print function, a flag other than a flag indicating that the extra print function does not affect the preceding or succeeding processes is defined; and outputting a warning if said determination unit determines that a problem will occur when the print functions are executed in the execution order set via the setting window.

6. The method according to claim 5, wherein in said displaying step, a non-selected function is not displayed in the setting window after a function to be executed finally has been selected in the setting window.

7. The method according to claim 5, wherein in said displaying step, a non-selected function is displayed in a manner that the non-selected function cannot be selected in the setting window after a function to be executed finally has been selected in the setting window.

8. The method according to claim 5, wherein, in the setting window, said displaying step disables selection of a print function for which a flag other than the flag indicating that the print function does not affect the preceding or succeeding processes is defined after selection of a print function for which either the flag indicating that the print function must be executed at the beginning of the print functions or the flag indicating that the print function must be executed at the end of the print functions is defined.

9. A non-transitory computer-readable storage medium storing a computer-executable program for an information processing method, said method comprising:
displaying a window for displaying print functions, a setting window for setting an execution order of the print functions and a preview window for displaying a print result obtained by executing the print functions in the execution order set via the setting window, wherein for each of the print functions, a flag indicating that the print function is a normal function without any restriction, a flag indicating that the print function must be executed at the end of the print functions, a flag indicating that the print function must be executed at the beginning of the print functions, or a flag indicating that the print function does not affect the preceding or succeeding processes, is defined;

transmitting to a printing apparatus print data by which the print functions are executed in the execution order set via the setting windows;

determining based on the flags whether a problem will occur or not when the print functions are executed in the execution order set via the setting window, wherein it is determined that the problem occurs in a case when there is an extra print function after a print function with a flag indicating that the print function must be executed at the end of the print functions and, for the extra print function, a flag other than a flag indicating that the print function does not affect the preceding or succeeding processes is defined, or in a case when there is an extra print function before a print function with a flag indicating that the print function must be executed at the beginning of the print functions and, for the extra print function, a flag other than a flag indicating that the print function does not affect the preceding or succeeding processes is defined; and outputting a warning if said determination unit determines that a problem will occur when the print functions are executed in the execution order set via the setting window.

10. A non-transitory computer-readable storage medium storing a computer-executable program for an information processing method as claimed in claim 9, wherein in said displaying step, a non-selected function is not displayed in the setting window after a function to be executed finally has been selected in the setting window.

11. A non-transitory computer-readable storage medium storing a computer-executable program for an information processing method as claimed in claim 9, wherein in said displaying step, a non-selected function is displayed in a manner that the non-selected function cannot be selected in the setting window after a function to be executed finally has been selected in the setting window.

12. A non-transitory computer-readable storage medium storing a computer-executable program for an information processing method as claimed in claim 9, wherein, in the setting window, said displaying step disables selection of a print function for which a flag other than the flag indicating that the print function does not affect the preceding or succeeding processes is defined after selection of a print function for which either the flag indicating that the print function must be executed at the beginning of the print functions or the flag indicating that the print function must be executed at the end of the print functions is defined.

* * * * *